Figure 3:
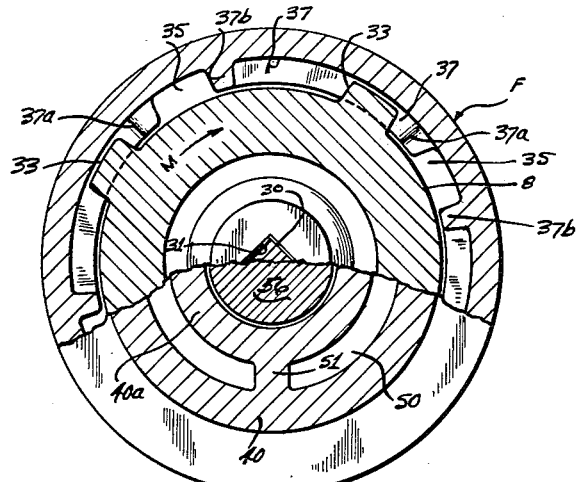

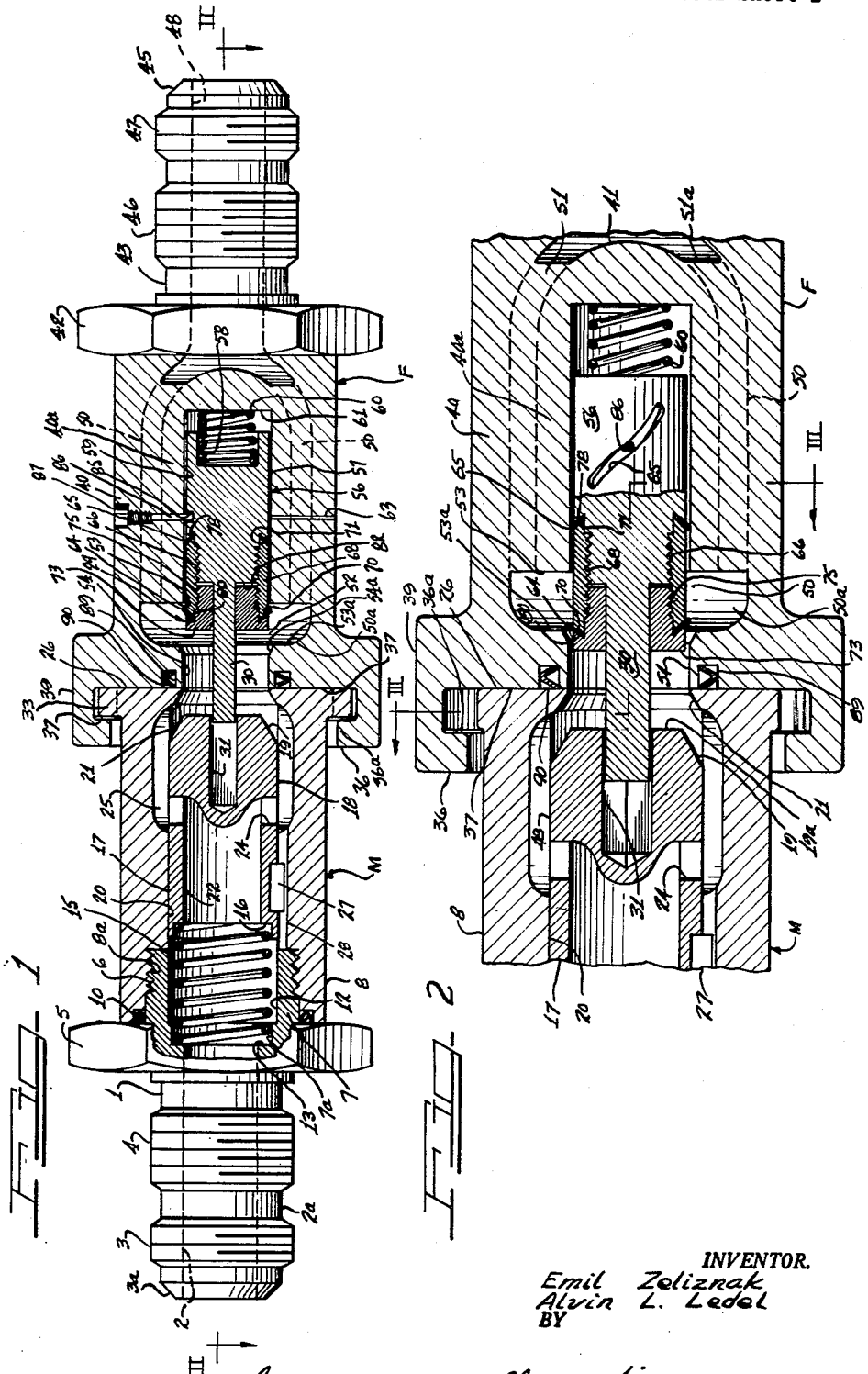

Dec. 3, 1963  E. ZELIZNAK ETAL  3,112,766
QUICK DISCONNECT FLUID COUPLING
Filed Aug. 29, 1960  2 Sheets-Sheet 2

INVENTOR.
Emil Zeliznak
Alvin L. Ledel
BY
Hill, Sherman, Meroni, Gross & Simpson
ATTORNEYS United States Patent Office 3,112,766
Patented Dec. 3, 1963

3,112,766
QUICK DISCONNECT FLUID COUPLING
Emil Zeliznak, Garfield Heights, and Alvin L. Ledel, Euclid, Ohio, assignors to Thompson Ramo Wooldridge Inc., Cleveland, Ohio, a corporation of Ohio
Filed Aug. 29, 1960, Ser. No. 52,635
10 Claims. (Cl. 137—614.05)

This invention relates to quick disconnect couplings for the making or breaking of a fluid pressure connection without appreciable loss of fluid. More particularly, this invention relates to such couplings for high pressure fluids and of the axially extending and engaged type angularly locked or unlocked by cooperating portions which may be male and female.

In a number of applications for such couplings, and particularly for such couplings which include seals to prevent the leakage of high pressure fluids at any time, it is desirable and important that the coupling can be readily connected or disconnected while under pressure without leakage or spillage and with a minimum volume between the close-off or loss preventing valves of each of the two-cooperating coupling parts to thus reduce to a minimum this source of fluid loss. A high degree of dependability is required and yet the simplest and most fool-proof type of operation is desired. It is preferred that there be no extra or special motions in use and that the entire connecting or disconnecting be by one simple motion for all the needed functions.

In order to be suitable for most of the widely differing types of fluids encountered in different applications, it is desired that the whole coupling be of all metal construction.

The present invention provides such a coupling in the form of a simple, reliable and fool-proof design which has a minimum number of separate pieces and may be of all metal construction. While the two main cooperating parts of this coupling may be remotely or indirectly actuated within the scope of this invention; yet the simplicity, low cost and reliability of a direct manual actuation is preferred here. Further, the actuation, of whatever type, is here by only a single motion. We prefer that this single motion be of a rotary type about the longitudinal axis of the two coupling parts after they have been brought together end to end and they and their face or end seal means axially engaged.

In our preferred embodiment, this single actuating motion is a limited angular motion between the main bodies of the two coupling parts with one twisted as a whole relative to the other to thus eliminate the need for any extra additional locking or actuating part. As an example of a simple, reliable, and low cost angular motion lock and means to hold the two coupling parts together end to end and against the fluid pressure, we disclose here a male and female, bayonet-type joint, having a limited maximum angular motion as shown herein.

Preferably, the structure is simplified by having the two cooperating portions of the lock or bayonet-type joint, each integral with each of the axially engaging end portions of the two main bodies, forming the two main coupling parts.

At least one of the coupling parts is so connnected that it can be moved axially and through the required limited rotation about its axis. Preferably, the coupling part for the fluid pressure receiving member or device is suitably connected for such motions, as by a conventional flexible hose.

Each coupling part has a safety biased or spring closed, leakage preventing, valve means therein. Each such valve means is shut off before the main end or face seal is disengaged and before the interlocking means is effectively unlocked during disengagement of this coupling. Similarly, during engagement of this coupling, the main or end seal is established and the two coupling parts are locked together before either of these two valve means open. These two valve means are of different types and have different actions with each including interrelated and improved features which are more fully disclosed in the following more detailed description of our invention.

According to our invention, the shut-off valve for the fluid pressure supplying part is of the positive and mechanically actuated type. It is always positively and directly opened or closed by only a part of the angular, lock actuating, motion for simplicity and a high degree of reliability in always providing that the fluid pressure supply is effectively shut off by ths valve before the interlocking means is unlocked and that the fluid pressure is not supplied until after the lock has been established during the connection operation.

In many applications, the coupling part for the fluid receiving side is expandable or a plurality are needed for use with one cooperating part on the pressure supplying side. For such reasons, we so interrelate the two cooperating parts that the fluid pressure actuated coupling subassembly is materially simpler and is a lower cost arrangement, preferably not including any main seals and having only one main moving element to form its automatically pressure operated shut-off valve. This valve is preferably the poppet type having a seat immediately adjacent to the plane of the joint of the mating faces of the coupling. This poppet valve is opened by fluid pressure acting on its inner end face against a coaxial compression spring biasing this generally cylindrical and hollow valve body towards its closed position to rapidly close it upon the shutting off, or material reduction of, the fluid pressure. Preferably, the supply of the fluid flow is around a solid and poppet forming head of this generally cylindrical valve body and then through the hollow valve body itself, axially on through the biasing spring into the end connection of this receiving coupling part. Other important and desirable features of this receiving or automatic coupling part are disclosed in the following more detailed description of our invention.

The other, or fluid pressure supplying coupling part includes the above noted manually operated shut-off valve. Preferably, it also includes the more expensive parts of this entire coupling and all of the main operating seals. Its positively or mechanically operated shut-off valve is preferably also of the cylindrical and axially reciprocating type having its valve forming end closely axially spaced from the valve seat for the above described poppet valve to thus reduce to a minimum the volume enclosed between these two shut-off valves.

Preferably this mechanically operated valve is of the slide type, sliding in and out of a valve seat defining bore to open or to shut off fluid communication and having extra or lost motion type axial motion beyond its just open position and beyond its just closed position, or in either direction.

The two cooperating coupling parts each include engageable and cooperating drive members to positively actuate the slide valve in both axial directions, and as directly as possible, by the above noted angular locking motion. This actuation is given by a suitable angular to axial or linear or motion converting cam means which is preferably of the screw or helical type. In our exemplary embodiment this consists of a cam track or helical groove about the periphery of the cylindrical slide valve which is both axially movable and rotatable and has a stator element, such as a valve casing mounted pin engaging in its helical slot.

The fluid receiving or automatic coupling part has a suitable member connected to rotate therewith as it is given its angular locking or unlocking bodily motion.

This member has a connectable and angular motion transmitting clutch means cooperating with the movable valve of the fluid supplying coupling part to rotate it or give it an angular motion when this member is turned. Preferably, the axially exposed poppet end of the poppet valve of the fluid receiving or automatic coupling part forms one element of this axial motion permitting but rotary motion transmitting, detachable, clutch means to cooperate with a corresponding clutch part on the adjacent axial end portion of the slide valve of the fluid supplying coupling part.

In our exemplary embodiment, this angular motion transmitting and detachable clutch is provided by a non-circular tang or spline extending axially from one of the valve members (and preferably rigid or integral therewith) and a correspondingly shaped socket, to slidably receive this tang, formed axially and centrally in the adjacent end of the other such valve member.

Also in our preferred embodiment, the required lost motion (whereby only a part of the angular locking or unlocking motion is needed to effectively open or shut off the mechanically actuated valve) is provided by the above mentioned extra axial sliding motion or the slide valve on either side of its opening or closing position.

It will be understood that these two cooperating and angular motion transmitting clutch elements are readily engaged when the two coupling parts are lined up and brought together end to end. It is also to be understood that the cooperating portions of the locks (such as the lugs of the bayonet joint and their corresponding slots on the other coupling part) are accurately angularly indexed relative to the above noted, non-circular, and rotation transmitting clutch elements of the two coupling parts. Suitable key means is supplied to prevent rotation of the slidable, pressure actuated, and preferably poppet type valve so that it will always rotate with its valve body or its coupling part.

While it will be understood that the cam actuated valve of the fluid supplying part may, if desired, be actuated in either direction only by the above noted cam or helix means, yet, in our exemplary embodiment, we prefer to provide an additional or safety actuating means for this valve. This is provided by a coaxial compression spring acting on the outer or inactive end of this cylindrical slide valve to bias it toward its closed position to take up the lost motion of any clearances and to aid in opposing the fluid pressure forces acting on the other or active end of this slide valve. This slide valve may be of the unbalanced type, having its outer or spring biased end vented to the atmosphere and having a suitable and inclined seal on this valve to prevent leakage into the vented space. The other end of this slide valve also has an oppositely inclined seal to hold high fluid pressures and to cooperate with its slidably engaged stator valve body surface.

It is also to be understood that the axially inner or mating end face of the fluid supplying coupling part has at least one (and preferably the only) axially expansible and high pressure type seal to be engaged by the corresponding mating face of the other coupling part. This mechanically actuated coupling part also includes other important features of this invention which are described in the following more detailed description and in connection with the accompanying drawings.

It will be apparent that the simple, low cost, foolproof and leak-proof coupling of this invention (which is preferably of all metal construction) is adapted for efficient use in a wide variety of applications and for a number of different fluids or liquids under pressure.

Accordingly, the general objects of this invention are to provide a quick disconnect fluid coupling, particularly for high pressures and for a variety of different fluids and different types of applications, which is simple, of low cost, reliable, and fool-proof, which always effectively prevents fluid loss when connected or disconnected, and which is very easy to use, requiring only one simple motion for all functions thereof.

Another object hereof is the provision of such a coupling embodying positive means to prevent fluid loss by always first interlocking the coupling parts and establishing a seal therebetween before fluid communication is opened and by always first shutting off fluid pressure before said coupling parts are unsealed and unlocked.

A further and more specific object hereof is the provision in such a coupling, with an intersealed and relative angular motion lock type, of a leakage preventing, shut-off valve in one coupling part to be positively and directly operated by such locking or unlocking angular motion and an automatic or fluid pressure operated valve in the other coupling part, which automatic valve is responsive in its operation to the shutting off, or the establishment of, pressure by said positively actuated valve.

Another and more specific object hereof is a provision of such a coupling of all metal construction.

Another and more detailed object hereof is the provision of such a coupling in which the fluid receiving coupling part is simple, contains no main seals, and is of low cost, while the cooperating pressure fluid supplying coupling part includes the necessary seals and the more costly operating elements.

A further and specific object hereof is the provision of such a coupling including a positive drive clutch means and cooperating rotary to linear motion converting means to actuate the shut-off valve of one coupling part by relative angular movement between said coupling parts.

Still another and specific object hereof is the provision of such a coupling wherein the shut-off valve of one coupling part includes clutch means for the positive actuation of cooperating clutch means on the shut-off valve of the other and cooperating coupling part.

Other objects, features, and advantages of this invention will be apparent to those skilled in this art from the following more detailed description taken in conjunction with the accompanying drawings.

Figure 4:
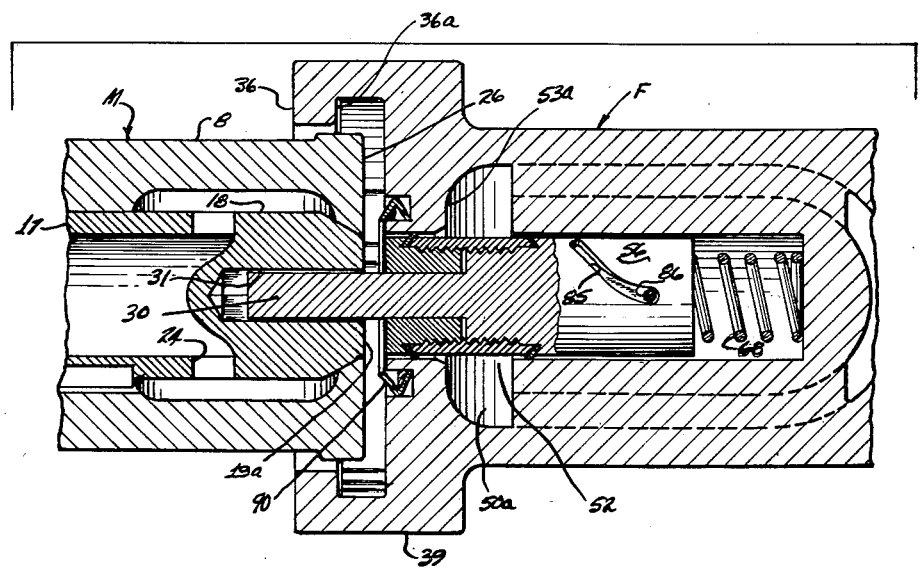

In the drawings:

FIGURE 1 is an elevational view with its broken away inner portion in axial section showing a quick disconnect coupling according to our invention with its male and female parts in their fully interlocked, sealed and fully connected position for fluid flow therethrough;

FIGURE 2 is an enlarged axial section taken on a plane at 90° to that of FIGURE 1 through the broken away inner ends of these same male and female parts which are shown partly unlocked and with the left hand or male part partly rotated relative to the fixed female part to an intermediate position so that the parts are between their fully separated position and their fully interlocked position and with a broken away portion showing part of an internal valve body and its helical groove in full with its pin sectioned;

FIGURE 3 is a similarly enlarged, transverse, sectional view taken on the lines III—III of FIGURE 2; and FIGURE 4 is a similarly enlarged, axial, sectional view taken on a plane at 90° to that of FIGURE 1 through the broken away inner end portions of the same male and female coupling parts in their fully unlocked and separated (and consequently internally closed off) condition and with a broken away portion showing part of the same internal valve body and its helical groove in full with its pin in section.

In the exemplary and presently preferred specific form of our invention illustrated in the accompanying drawings, the coupling assembly comprises two main parts. The first part is the simpler and lower cost one. Preferably or usually, it is operatively and movably connected (as by a flexible hose or the like) to the member to be supplied with, or to receive, the hydraulic fluid. This first or left hand coupling part includes, as its leakage preventing or shut-off means, an automatic or pressure actuated valve which is biased or spring pressed to quickly move to its closed position and is forced open by the fluid pressure which overcomes the biasing spring, only after the establishment of a flow connection therethrough by the other and cooperating coupling part. While this first part may be either male or female as to its interlocking means, it is here illustrated as having the male type, bayonet lock interlocking means and is designated as a whole by M.

The second or other main operative part of the coupling is deliberately made as the more complex and costly of the two sub-assemblies, since it is preferably or normally to remain suitably connected to the fluid pressure supply. This connection may be a rigid one, if desired. It includes, as its leakage preventing and shut-off means, a valve which is mechanically actuated by the interlocking or unlocking motion used in the connecting or disconnecting of the two coupling parts. Since this right hand coupling part has the female portions of the bayonet type interlock, it is here designated as a whole by F.

While under the broader purview of this invention the interlocking means may be achieved by various mechanisms, of the indirectly operated, power actuated, or of other known types, yet we prefer the simplicity and reliability of the simple bayonet lock having its cooperating portions integral with the main portions of the bodies of the two coupling parts.

Turning to the specific construction features of our exemplary embodiment, it will be seen that the male sub-assembly or part M comprises the outer end screw connection fitting and inner nut portion formed by the one piece body 1, which has cylindrical bore or passage 2 therethrough. Adjacent its outer end, body 1 has the conventional, high pressure type and enlarged threaded portions 3 and 4 for a leak-proof connection (as by a flexible hose) to the unit to be supplied with the fluid under pressure.

Body 1 also includes the integral, enlarged hex nut portion 5 and the external threads 6 on the reduced cross section, axial extending, inner and integral extension portion 7.

It will be noted that this extension 7 and the extension 2a on the other side of nut 5, are each hollow to provide communicating, axially extending, cylindrical bores. The bore 2 of extension 2a is of smaller diameter than the communicating inner end bore 7a, which in turn opens into the slightly larger and smooth cylindrical bore 12, which also forms a smooth and accurate slide guide surface for the shut-off valve.

As shown, the cylindrical and hollow valve casing or valve body 8 of part M has an enlarged and threaded portion 8a at its outer end to be tightly and normally permanently, threaded over the corresponding threads 6 of extension 7. The outer end of element 8 is recessed as shown to contain the suitable, high pressure type end or face seal 10 acting against the corresponding axial end portion of the hex nut portion 5.

As shown, the smooth and accurate inner cylindrical bore 12 of portion 7 is continued in the identical cylindrical bore 20 in part 8.

The end wall 13 of reduced bore 7a forms a seat for the outer end of the compression spring 15 whose inner end is received in a correspondingly recessed seat portion 16 enlarged from the inner cylindrical bore 22 of the preferably one-piece valve member 17 which has a freely sliding fit in the corresponding cylindrical bore 20 and its bore extension 12.

This valve plunger 17 is preferably of the poppet type, having the solid integral end portion 18. Its innermost end is tapered to form the poppet type valve portion 19, which is seated in the similarly shaped valve seat 21 machined into the entrance or inner end of body 8 as shown.

It will be noted that the inner end or edge of the valve seat 21 ends at the inner flat face 26 of the inner body portion 8. Thus the inner end 19a of the poppet valve portion 19 is in, or is substantially in, the plane of this inner flat face 26 when the poppet valve 18 is closed.

The inner cylindrical bore or passage 22 of valve body 17 opens through a plurality of ports or round holes 24 into an internally enlarged, annular passage portion 25 leading to the poppet valve seat 21. The poppet type valve 17, 19 is opened by the differential or pressure difference between the higher supply or source pressure and the lower outlet or supplied pressure acting on its inner end and also overcoming the suitably selected stiffness of its closing compression spring 15.

Member 17 is held against rotation relative to its enclosing valve body 8 by any suitable means such as the key 27 suitably mounted in the outer extension portion of valve body 17 and slidable, but non-rotatable, in the suitable and corresponding keyway 28 machined into the cylindrical bore 20.

A preferably centrally located and axially protruding, non-circular, rotary drive tank or male clutch means 30 is suitably and rigidly secured on either one of the inner valve ends of the coupling units or parts M or F with a cooperating and similarly non-circularly shaped and centrally located female drive socket 31 formed into the end of the other valve body. It will be noted that this male rotary drive or clutch element 30 is freely axially slidable in its drive socket. As shown and in this exemplary embodiment, the male 30 and the female drive socket 31 is formed with square cross section. Female 31 is an axially extending hole in the solid end portion 18 of poppet valve body 17. Male 30 is integral with valve 56 as shown.

The inner end of cylindrical body portion 8 has a suitable type of angularly actuated locking means about its enlarged periphery and preferably very closely adjacent to its inner end. In the present exemplary embodiment, this locking means is illustrated as being of the bayonet type to be locked or unlocked by, for example, less than a quarter turn.

While it will be understood that unit M may carry either the female or the male portion of such interacting locking members, yet we here prefer to have the simpler and lower cost, coupling part (which includes the automatically or fluid pressure actuated shut off valve) to have the male locking portions thereon since they are lighter, simpler, and of smaller diameter. Accordingly the preferably four internal or male locking lugs 33 of the bayonet joint are preferably formed as radially outer, integral extensions of the body 8 with their axially inner ends coplanar with the flat end face 26. These locking lugs 33 cooperate with the surrounding and female portion of the bayonet joint, which is hereafter disclosed.

It will be apparent that locking lugs 33 of the bayonet joint are freely axially received in the correspondingly shaped openings or notches 35 formed in the inwardly extending and axial motion preventing (and otherwise circular or annular) lip 36. The outwardly directed face 36a of this lip 36 is machined to supply the four end or face type cam surfaces 37. The relatively abrupt start or initial rise portions of these four cams 37 are shown at 37a in FIGURE 3. The remainder of these cam surfaces 37 may be of substantially uniform axial height or rise. These axially extending cam surfaces force the two parts M and F and their mating flat surfaces 26 and 37 into tighter engagement as soon as the two portions M and F (or their locking parts) start to rotate into their interlocking position since the lugs 33 will ride up on these cam surfaces as they turn in their four annular slots 37a. This also compresses seal 90 as hereinafter disclosed. Stops 37b limit the locking travel of lugs 33. These stops are shown as integral with portion 39.

Preferably the annular locking lip 36 is formed integral with the enlarged cylindrical end portion 39 of the preferably one-piece cast body of coupling part F.

The radially outer portion 40 of one-piece body F includes the preferably integral and enlarged hex nut portion 42 and the reduced and axially extending end portion 43 carrying the two enlarged and conventional screw fitting portions 46 and 47 which are like the screw fitting portions 3 and 4 of part M. Like 3a of part M, this fitting ends in the tapered sealing portion 45.

The cylindrical bore 48 through the extension 43 is also generally like the bore 2 through the outer and extension of part M. This cylindrical bore 48 communicates with the plurality of curved or generally radially extending cored out passages 50 separated by the connecting ribs 51 which integrally connect the outer cylindrical body part 40 to its radially inner and generally cylindrical portion 40a. Ribs 51 extend to face 53 at their inner ends and may have their axially outer ends 51a, at or short of, the end 41 of the inner body portion 40a as shown in FIGURE 2. The inner ends of these curved passages 50 open into the curved and inwardly and radially directed passage portions 50a which, in turn, open into the radially directed port or annular valve opening 52.

This port 52 has its axially outer end defined by the inner end 53 of the inner body portion 40a which forms the guide recess for the slide valve. The other and inner axial end of port 52 is defined by the end wall 53a which has the central, cylindrical valve bore 54 therethrough. Preferably, this cylindrical bore 54 has an outer end or entrance, tapered portion 54a to initially engage and center and to push in the hereinafter described bore seal 65 of the slide valve. This cylindrical bore 54 extends to the inner flat mating face 37 of part F. Preferably this bore extends uniformly to this flat mating face 37, as shown.

The cylindrical slide valve body unit for coupling part F is designated as a whole by 56. Preferably, slide valve unit 56 is formed, as shown, by the main outer end and mostly solid portion 57 which has an easy sliding fit in the correspondingly cylindrical bore 59 formed in the inner body portion 40a as a slide guide for valve unit 56. Preferably this fit is relatively loose as illustrated to give room for seal 65. Similarly the active end 73 of valve 56 is loose in bore 54 to provide room for the action of its inclined seal 64 as will be understood by those skilled in this art.

The inner end portion of valve unit 57 is recessed as shown at 58 to receive the inner end of the valve biasing compression spring 60 whose outer end reacts and abuts against the end wall 61 of the bore 59.

Preferably the portion of valve guide bore 59 inward of its valve seal 65 is vented to atmosphere as by a suitable vent passage 63 extending radially through one of the connecting ribs 51 between body portions 40 and 40a.

In order to suitably assemble and secure the two oppositely inclined and suitable, high pressure type, seals 64 and 65, the inner end of valve portion 56 is reduced and threaded as shown at 66, to receive the correspondingly threaded interior of the seal holding sleeve 68. It will be noted that sleeve 68 has an external diameter matching that of valve body 57 and has its two axial ends 70 and 71 inclined to define the inclination of the oppositely inclined inner and outer seals 64 and 65 respectively.

The inner and active end of the valve unit 56 is formed by end portion 73 having the reduced and threaded inner end portion 75 threaded into the threads of sleeve 68 and having an outer diameter matching that of sleeve 68 and body portion 57.

As illustrated, the inner flat end of 73 is in the plane of the inner mating face 37 of part F, or very close thereto, when the slide valve unit 56 is in its fully closed or fully inward position, as shown in FIGURE 4.

As shown, the seal engaging end surface 78 of the inner valve portion 57 is inclined parallel to the relatively axial movable, outer end, and seal engaging surface 71 of the sleeve 68. Thus, the seal 65 is held in its desired inclined position and is secured in place when the sleeve 68 is screwed axially outward onto valve portion 57.

Similarly, the axially outer and seal engaging surface 80 of the inner valve end portion 73 is inclined parallel to and matches the inclination of the seal retaining surface 70 of the sleeve 68. Thus seal 64 is held in its desired inclined position and tightly secured when end 73 is screwed outwardly into the inner threads of the sleeve 68. The clearance 82 provides for any additional needed outward travel of valve end portion 73 to take up on seal 64.

The angular motion of locking or unlocking is converted to actuate the side type valve 56 in its axial motion in either direction. In our exemplary embodiment, this is achieved by the helical cam track or screw-like groove 85 which is machined into the periphery of the solid section 57 of the valve 56. This groove is engaged by the reduced end 86 of the pin-screw 87 having an enlarged outer head with a kerf therein. This screw with its track engaging inner end pin 86 is threaded as shown, into a correspondingly shaped and threaded hole and preferably with its outer end substantially flush with or, slightly countersunk below, the outer wall of the outer body portion 40.

It will be noted that the pitch or angle of the helix cam track 85 is arranged to actuate valve 56 from end to end of its travel, while the corresponding relative angular motion between the two coupling parts M and F (or their locking portions) moves the lug 37 from end to end of their total travel in their corresponding slots 37a of the bayonet joint. The pin 86 is suitably angularly indexed to the hex nut 42 and to lock portions 35, 37a and 37b. The cam track 85 of valve 56 is similarly indexed by pin 86 and relative to square clutch pin 30.

As will be readily understood by those skilled in this art, all portions of M and F may be made of a suitable metal, which is all preferably the same or has the same coefficient of thermal expansion to prevent any thermal warping of differential expansion between different parts. The body portions 1, 8, and 40—40a are preferably cast from cast steel or other suitable metal and machined as needed at engaging or operating surfaces.

The operation and use of the hereinabove structure is described generally above. In more detail, it will be noted that since the locking means 33 and 37a are indexed to the helical groove 85 and the groove engaging pin 86 by the interconnecting angular motion transmitting clutch 31 and the rotation preventing spline and groove 27 and 28; that angular motion between the two bodies M and F (as by means of their similarly oriented hex nuts) will bring the two mating faces 26 and 37 into a tight engagement by means of the axially acting cam surfaces 37 of the bayonet lock. This bringing together of the two mating faces also serves to axially compress and suitably tightly engage the main end face seal 90.

This suitable type high pressure seal, is mounted in the axially opening and annular groove 89 which is preferably located in the end face 37 of the more complex coupling unit F, so that substantially all of the seals (except the simple and low cost seal 10) are located in the part F which is intended to be connected to the pressure source, as explained above.

Due to the above described lost motion or over-travel of the slide valve 56 beyond its effectively open position and beyond its closed position, this valve is thus positively or manually always closed before the coupling is unlocked and opened only after the coupling is effectively locked.

An understanding of the operation will be facilitated by a comparison of the positions of the parts in the several figures of the drawings. As shown in FIGURE 1, the parts are fully interlocked. As shown in FIGURES 2 and 3, the coupling parts are shown in an intermediate position during unlocking with the seal 64 of piston or slide valve 56 just about to be compressed or bent in as it enters loose valve bore 54 to effectively shut off the fluid pressure supply to coupling part M.

As shown in FIGURE 4, the unlocking has been completed and the parts M and F are partially axially disengaged. It will be noted here that the ends 21 and 73 of valves 17 and 56 respectively, are in (or very close to) the mating faces 26 and 37 respectively, so that a very minimum of fluid volume is between them.

The opposite inclinations of seals 64 and 65 provides for their being bent and seated in their bores by fluid pressure from end 43. It will also be noted that after seal 64 has initially shut off fluid pressure during a closing motion in unlocking and valve 17 of M has then rapidly closed, that the inclination of seal 64 will permit the squeeze past of any fluid (especially a relatively non-compressible liquid) which may be trapped in the volume between the ends of the valves and in the loose fit of bore 54.

The lost motion or over-travel of valve 56 in either direction from its just closing position, is an important feature of this invention and in cooperation with the actuation features hereof, as disclosed above.

Although we have herein set forth our invention in some detail and in terms of only one exemplary embodiment thereof, it will be apparent to those skilled in this art that the teachings and advantages of this invention may be employed in various other arrangements and that various modifications may be made without departing from the spirit and the scope of this invention as set forth in the appended claims.

We claim as our invention:

1. A quick disconnect coupling for fluid under pressure comprising first and second cooperating coupling units each having bodies with open, mating end faces, interengaging mechanical locking means rigid with each of said two coupling unit bodies adjacent to said faces to lock said two faces together or to unlock them by a predetermined amount of a first type of relative motion between said two bodies and their locking means, each coupling unit having therein a valve means movable by a second type of motion to shut off fluid flow close to said mating faces to reduce fluid loss, said first coupling unit having means to open its valve means automatically only after it is locked and to automatically close its valve means before it is unlocked and means to prevent a said first type of motion between its valve means and its locking means, each valve means having a cooperative clutch element adjacent said open mating faces, said clutch elements being engageable to transmit said first type of motion from the locking means of said first coupling unit to the valve means of said second coupling unit, said second coupling unit having cam means acting between its valve means and its body and locking means to convert said clutch transmitted first type of motion to said second type of motion to actuate its valve means in either direction through a lost-motion travel beyond its effectively opened and effectively closed positions.

2. A quick disconnect coupling for fluid under pressure comprising first and second cooperating and all metal, coupling units each having bodies with open mating end faces including cooperating seal means, interengaging mechanical locking means on and movable with, each of said two coupling unit bodies adjacent to said faces to lock said two faces together or to unlock them by a predetermined amount of a first and angular type of relative motion between said two bodies and their locking means, said locking means including cam means to cam said two mating faces together and engage said cooperating seal means, each coupling body having therein a valve means movable by a second and linear type of motion in its body to shut off fluid flow close to said mating faces to reduce fluid loss, said two valve means moving towards each other to close and being close together when closed, said first coupling unit having automatic means actuated by said fluid pressure to open its valve means when it is connected and before it is unlocked and means to prevent said first angular type of motion between its valve means and its body and locking means, each valve means having a cooperating male and female type clutch element adjacent said open mating faces, said clutch elements being engageable by a said second and linear type of motion to transmit said first and angular type of motion from the lock and means and body of said first coupling unit to the valve means of said second coupling unit, said second unit having a helical track means acting between the periphery of its valve means and its body and locking means to convert said clutch transmitted first and angular type of motion to said second and linear type of motion to mechanically actuate its valve means in either direction, the valve means of said second unit having a lost motion travel in either direction beyond its open and closed positions to positively and mechanically close it before the two units are unlocked and open it only after the two units are locked together.

3. A self-closing quick disconnect coupling for a fluid under pressure comprising first and second connectable portions, said first portion having a fluid pressure operated valve therein, said second portion enclosing a mechanically actuated valve having actuating means including connectable clutch elements on said two valves and cam means acting between said second portion and its valve.

4. A self-closing, quick disconnect coupling for a fluid under pressure comprising first and second connectable portions, said first portion having a fluid pressure operated valve therein, said second portion enclosing a mechanically actuated valve, said two valves having closely adjacent closed positions and moving away from each other to open, and actuating means for said mechanically actuated valve including engageable and rotation transmitting clutch elements on the adjacent ends of said two valves and also including motion converting means acting between said second coupling portion and its valve to change the transmitted rotation to a different motion to move said mechanically actuated valve.

5. A quick disconnect coupling for fluid under pressure including first and second cooperating coupling parts, a first coupling part having a body with an open end face and adjacent locking means to be locked or unlocked from cooperating locking means adjacent a cooperating open end face of said second coupling part by a predetermined amount of a first type of relative motion therebetween, a valve in said first coupling part movable therein by a second type of motion to shut off fluid flow closely adjacent to said open end faces to reduce fluid loss, said valve having such means adjacent to said open end to transmit said first type of motion thereto when engaged by the cooperating clutch means on said second coupling part, motion converting cam means acting between said valve and said first coupling part to move said valve by said second type of motion and open or close it upon said locking or unlocking, respectively, said first coupling part having lost-motion means to actuate said valve in either direction by only a part of said predetermined amount of relative motion so that said valve is effectively opened only after said two coupling parts are locked together and said valve is closed before said two coupling parts are unlocked.

6. An elongated, quick disconnect fluid coupling part having an axially open end face and locking means adjacent thereto to be engaged and locked to a suitable cooperating coupling part by relative angular motion therebetween, an axially reciprocable, loss preventing valve in said fluid coupling part shutting off fluid flow closely adjacent to said end face, said valve having a central, rotation transmitting clutch means at said open end face to be engaged by a cooperating clutch means on said relatively angularly rotatable and cooperating coupling part, and helix means acting between said fluid coupling part and its said valve to convert said angular motion of its said valve to linear motion to shut its said valve by the locking motion of said fluid coupling part relative to the cooperating coupling part and to open said valve by the unlocking motion of said fluid coupling part relative to the cooperating coupling part.

7. An elongated, quick disconnect fluid coupling part having an axially open end face having axially engageable seal means therein and locking means adjacent thereto to be engaged and locked to, or unlocked from, a cooperating coupling part by a predetermined amount of a relative angular motion therebetween, and axially reciprocable, cylindrical, loss preventing slide valve therein cooperating with valve ports located in said coupling part to shut off fluid flow closely adjacent to said end face, said valve having a central, rotation transmitting, non-circular, clutch means extending axially at said open end face to be axially engaged or disengaged by a cooperating coupling means on said relatively angularly rotating and cooperating coupling part, and cam means to convert said angular motion of said valve to linear motion thereof in either direction to shut said valve by the first part of said predetermined unlocking motion and to open that said valve by the last part of said predetermined locking motion comprising a helical track on the periphery of said cylindrical valve and a track engaging projection on said coupling part.

8. An elongated quick disconnect fluid coupling part having an axially open end face and locking means adjacent thereto to be engaged and locked to, or unlocked from, a cooperating coupling part by a predetermined amount of a relative angular motion therebetween, an axially extending cylindrical bore in said part, a cylindrical slide valve axially reciprocable in said bore cooperating with valve port means therein closely adjacent to said open end face to reduce fluid loss, said valve being rotatable in said bore and having at its end adjacent said open end face a central, axially extending, and axially engaged or disengaged, male and female type clutch means to transmit rotary motion from a cooperating clutch means on said relatively angularly rotatable cooperating coupling part, and helix means acting between said bore and the periphery of said cylindrical valve to move said valve axially in either direction to open or shut it by only a part of said predetermined relative angular motion of said locking or unlocking so that said valve is opened only after said two coupling parts are locked and said valve is closed before said two coupling parts are unlocked.

9. A quick disconnect, fluid pressure coupling comprising two axially extending coupling parts having a fluid passage therethrough from end to end and connection means at their free ends, said parts having axially engageable flat end faces and adjacent and relatively rotatable interlocking means, one of said parts having an axially movable and fluid pressure actuated poppet valve therein and the other coupling part having an axially movable, slide type valve therein, said valves having closely adjacent, fluid flow shut-off valve seat means to reduce the loss of fluid therebetween, and means actuating said slide valve in either direction by the relative rotation between said interlocking means to effectively open said slide type valve to permit flow only while there is a substantial and predetermined locking between said interlocking means, said means to actuate including engageable and rotation transmitting clutch elements on the adjacent ends of said two valves.

10. A quick disconnect coupling for fluid under pressure comprising end to end connected and axially extending first and second coupling units, each having a fluid passage therethrough, flat, end, mating faces at their connected inner ends, and inner engageable locking means rigidly thereon to lock together or unlock said units by relative angular motion therebetween about said axis, said first unit being simpler and of lower cost and being adapted to be connected to a fluid supplied body and having a fluid pressure operated valve means therein to shut off fluid flow close to its flat mating face, said second coupling unit including therein substantially all sealing means of said coupling and being adapted to be connected to a source of fluid pressure and having a central, axially movable, cylindrical slide valve therein whose active inner end closes or opens an annular radial valve port defined at its outer end by an outer valve guide recess forming portion and at its other and inner end by an inner end wall having a relatively short cylindrical bore to loosely receive the inner and active end of said slide valve and extending to said flat mating face, the outer end of said valve recess being vented to atmosphere and having a compression spring therein biasing said slide valve towards its closed position, a portion of said through fluid passage opening from said port and extending around said slide valve, a fluid pressure seated ring seal having its radial outer edge inclined towards the outer end of said unit on said cylindrical valve adjacent its inner end to engage said bore and a second and oppositely inclined fluid pressure seated ring seal on said cylindrical slide valve to engage in its outer valve guide recess, and means to actuate said cylindrical slide valve with an over travel in each direction beyond its effectively open position and beyond its closed position into said bore to its inner end adjacent said flat mating face, said valve actuating means including helical cam means acting between said slide valve and its guide recess and clutch means to rotate said slide valve by angular locking or unlocking motion.

References Cited in the file of this patent

UNITED STATES PATENTS

| | | |
|---|---|---|
| 536,378 | Frey | Mar. 26, 1895 |
| 560,815 | Noyes | May 26, 1896 |
| 1,342,678 | Houghton | June 8, 1920 |
| 2,936,183 | Bashma | May 10, 1960 |

FOREIGN PATENTS

| | | |
|---|---|---|
| 527,938 | Italy | of 1955 |